(No Model.)

R. JOHNSTON.
INFLATABLE PUNCTURE PLUG FOR PNEUMATIC TIRES.

No. 545,232.  Patented Aug. 27, 1895.

Witnesses
Robert Watson
Will E. Neff

Inventor
Robert Johnston
by
J. Watson, Attorney

UNITED STATES PATENT OFFICE.

ROBERT JOHNSTON, OF WILKES-BARRÉ, PENNSYLVANIA.

INFLATABLE PUNCTURE-PLUG FOR PNEUMATIC TIRES.

SPECIFICATION forming part of Letters Patent No. 545,232, dated August 27, 1895.

Application filed June 15, 1895. Serial No. 552,942. (No model.)

*To all whom it may concern:*

Be it known that I, ROBERT JOHNSTON, a citizen of the United States, residing at Wilkes-Barré, in the county of Luzerne and State of Pennsylvania, have invented certain new and useful Improvements in Inflatable Puncture-Plugs for Pneumatic Tires, of which the following is a specification.

My invention relates to a new method and means for repairing punctures in pneumatic tires and similar articles. It is particularly applicable to that class of tires known in the trade as "single-tube" or "hose-pipe," but it may also be used to repair inner tubes or any other class of rubber articles or fabrics requiring the patch to be applied upon the inner side.

To this end it consists in an inflatable patch adapted to be folded and forced through the puncture, cemented, and then held by its internal air-pressure against the tire until the cement has set.

Figure 1:
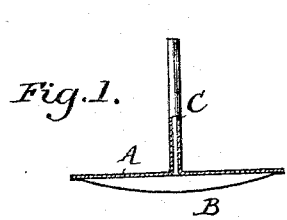
Figure 2:
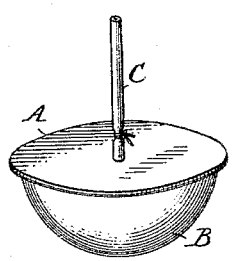
Figure 4:
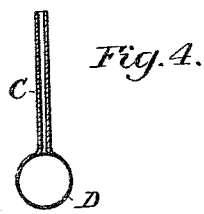
Figure 3:
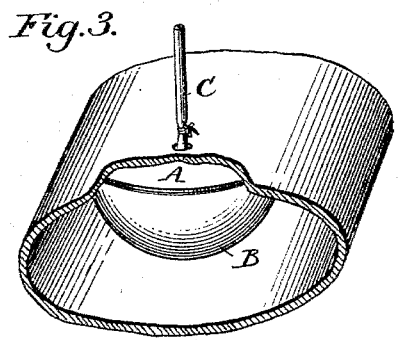
Figure 5:
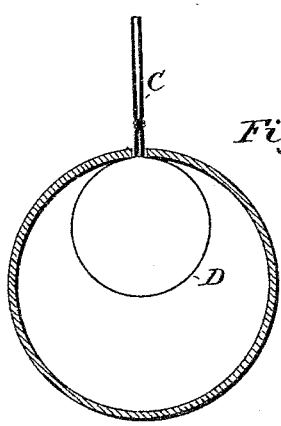
Figure 6:
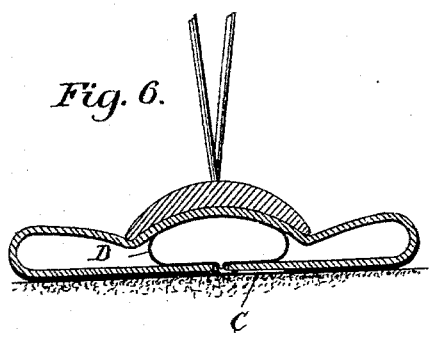
Figure 7:
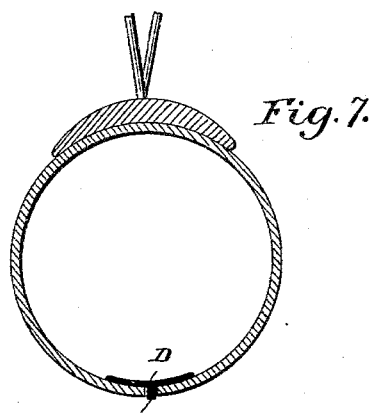

Referring to the drawings, Figure 1 is a central sectional view of the preferred form of my improved patch with inflating-tube attached. Fig. 2 is a perspective view of the same inflated. Fig. 3 is a similar view of the patch applied to a tire, the latter being partly broken away. Fig. 4 is a modified form of inflatable patch. Figs. 5 and 6 show the manner of applying it, and Fig. 7 shows a patch completed.

In the preferred form of my invention shown in Figs. 1, 2, and 3, A represents a piece of comparatively inelastic rubber fabric, preferably made in the form of a disk, and B represents a disk of thin pure rubber, the two disks being cemented together at their edges only, thus leaving a space between the disks for inflation. The disk A is perforated centrally and has a rubber inflating-tube C attached.

In applying the patch to a tire, it is folded about the stem in a manner similar to the folding of an umbrella, and it is then forced through the puncture, the latter, if necessary, being enlarged to admit the patch. As soon as the patch is entirely within the tire it flattens out and cement is then injected through the puncture onto the disk A. The patch is then inflated by blowing air into the tube C, which has the effect of forcing the cement-covered disk A against the tire. The inflating-tube is then clamped or tied with a string until the cement has set, when it may be cut off and the patch deflated. When the tire is inflated the internal pressure will force the disk B out against the puncture, thus forming a perfect seal.

In Figs. 4, 5, and 6, I have shown a modified form of patch and the manner of securing it. This patch consists of a tube C, having a closed thin rubber extension or sack D, which takes a globular form when inflated. The sack is inserted through the opening and partly inflated. Cement is then applied to the surface of the sack adjacent to the tube, and the sack is then fully inflated and the weight of the wheel allowed to press upon it until the cement has set, after which the tube is cut off and the tire is ready for use.

It is desirable, with either form of patch shown, to let the weight of the wheel rest upon the inflated patch while the cement is drying in order to insure perfect contact between the patch and the tire, except in cases where the tire is small in cross-section and the patch can be inflated to the full diameter of the tube.

It will be obvious that various modifications and changes may be made in the form and arrangement of my improved patch and the method of applying the same without departing from the spirit of the invention, and I therefore do not care to limit myself to the exact form shown and described.

What I claim, and desire to secure by Letters Patent of the United States, is—

1. The method of patching hose or tire which consists in forcing an inflatable patch through the puncture while the patch is deflated, injecting cement upon the outer side of the patch, then inflating it and maintaining it in the inflated condition until the cement has set, substantially as set forth.

2. A hose or tire patch consisting of an inflatable sack adapted to be inserted through a puncture, and means for inflating the sack after its insertion in the hose or tire, substantially as described.

3. A hose or tire patch consisting of an elastic inflatable sack adapted to be inserted through a puncture and provided with an inflating tube for inflating the sack after its insertion in the hose or tire, substantially as described.

4. A hose or tire patch consisting of an elastic sack or disk and a relatively inelastic disk joined together at their edges, in combination with an inflating tube opening into the space between said parts, substantially as described.

5. A hose or tire patch consisting of a sack or disk of thin rubber and a disk of thicker rubber or rubber fabric joined at their edges in combination with an inflating tube opening into the space between said parts, substantially as described.

In testimony whereof I affix my signature in presence of two witnesses.

ROBERT JOHNSTON.

Witnesses:
BENJAMIN F. CONNER,
WILLARD G. KELLER.